US008651546B2

(12) United States Patent
Vasko et al.

(10) Patent No.: US 8,651,546 B2
(45) Date of Patent: Feb. 18, 2014

(54) VEHICLE CENTER CONSOLE TRIM ASSEMBLY

(75) Inventors: Melaina Vasko, Highland Township, MI (US); Walter Yourke, Highland Township, MI (US); Thomas Mally, Beverly Hills, MI (US); Douglas Dawe, Milford, MI (US)

(73) Assignee: Nissan North America, Inc., Franklin, TN (US)

( * ) Notice: Subject to any disclaimer, the term of this patent is extended or adjusted under 35 U.S.C. 154(b) by 7 days.

(21) Appl. No.: 13/416,008

(22) Filed: Mar. 9, 2012

(65) Prior Publication Data

US 2013/0234463 A1 Sep. 12, 2013

(51) Int. Cl.
*B60R 7/04* (2006.01)

(52) U.S. Cl.
USPC .......................................... 296/24.34

(58) Field of Classification Search
USPC .................................. 296/24.34, 37.8, 37.13
See application file for complete search history.

(56) References Cited

U.S. PATENT DOCUMENTS

2003/0122392 A1* 7/2003 Larsen et al. ................ 296/24.1
2010/0123327 A1* 5/2010 Fitzpatrick .................. 296/37.8
2010/0156131 A1 6/2010 D'Alessandro et al.

FOREIGN PATENT DOCUMENTS

| JP | 2002-362233 A | 12/2002 |
| JP | 2004-182032 A | 7/2004 |
| JP | 2005-132265 A | 5/2005 |
| JP | 2005-319841 A | 11/2005 |

OTHER PUBLICATIONS

U.S. Appl. No. 13/278,845, Kwolek
Exerpt from the 2012 Nissan Titan Owner Manual (1 page).

* cited by examiner

*Primary Examiner* — Dennis Pedder
*Assistant Examiner* — Beverly Becker
(74) *Attorney, Agent, or Firm* — Global IP Counselors (57) ABSTRACT

A vehicle center console trim assembly includes a console body and a cover. The console body includes a first side section and a ledge extending laterally from the first side section along a lower body portion of the console body. The cover is coupled to the console body and overlies a side surface of the first side section to form a side pocket between the cover and the side surface of the first side section with the ledge defining a bottom surface of the side pocket. The cover includes an upper cover portion that extends along an upper body portion of the console body, which is spaced above the lower body portion of the console body, with the upper cover portion concealing the ledge of the first side section of the console body from view in a downward vehicle looking direction from a location above the console body.

20 Claims, 11 Drawing Sheets

VEHICLE CENTER CONSOLE TRIM ASSEMBLY

BACKGROUND

1. Field of the Invention

The present invention generally relates to a vehicle center console trim assembly. More specifically, the present invention relates to a vehicle center console trim assembly configured to form a side pocket that is concealed from view above the vehicle center console trim assembly.

2. Background Information

The passenger compartments of many vehicles include a vehicle center console that is typically positioned between the front driver's seat and front passenger's seat. A vehicle center console typically includes a storage compartment having a lid that can be opened to access the storage compartment and closed to conceal the storage compartment. However, storage space in the storage compartment is usually limited. Furthermore, although the lid is effective in concealing the contents of the storage compartment, the lid complicates access to the storage compartment.

SUMMARY

Accordingly, it is desirable to increase the storage capacity of the vehicle center console by providing additional storage spaces. It is also desirable for these additional storage spaces to be concealed from view and easily accessible by a driver or passenger.

In view of the state of the known technology, one aspect of a vehicle center console trim assembly includes a console body and a cover. The console body includes a first side section and a ledge extending laterally from the first side section along a lower body portion of the console body. The cover is coupled to the console body and overlies a side surface of the first side section to form a side pocket between the cover and the side surface of the first side section with the ledge defining a bottom surface of the side pocket. The cover includes an upper cover portion that extends along an upper body portion of the console body, which is spaced above the lower body portion of the console body, with the upper cover portion concealing the ledge of the first side section of the console body from view in a downward vehicle looking direction from a location above the console body.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
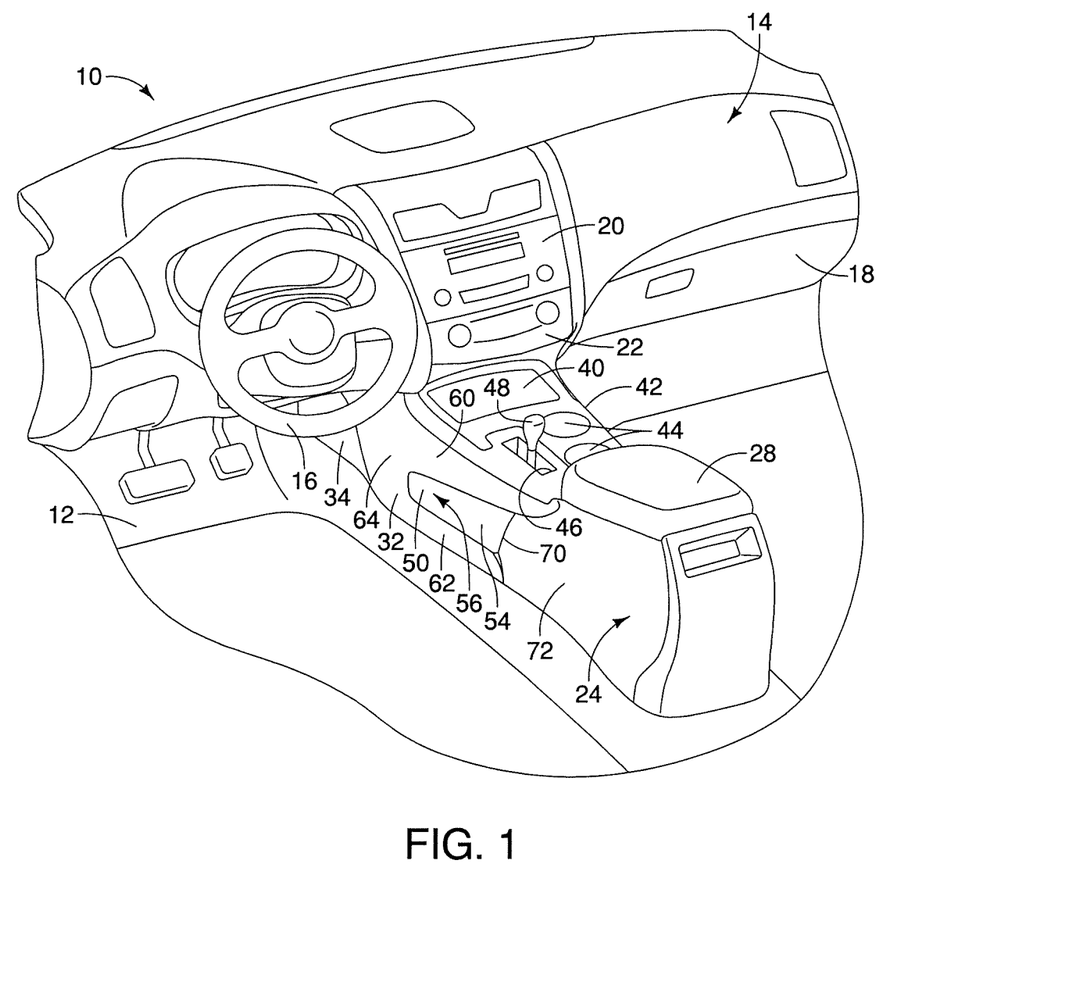
FIG. 1 is a perspective view of a passenger compartment of a vehicle showing an instrument panel and a center console that includes a vehicle center console trim assembly according to a disclosed embodiment.
Figure 2:
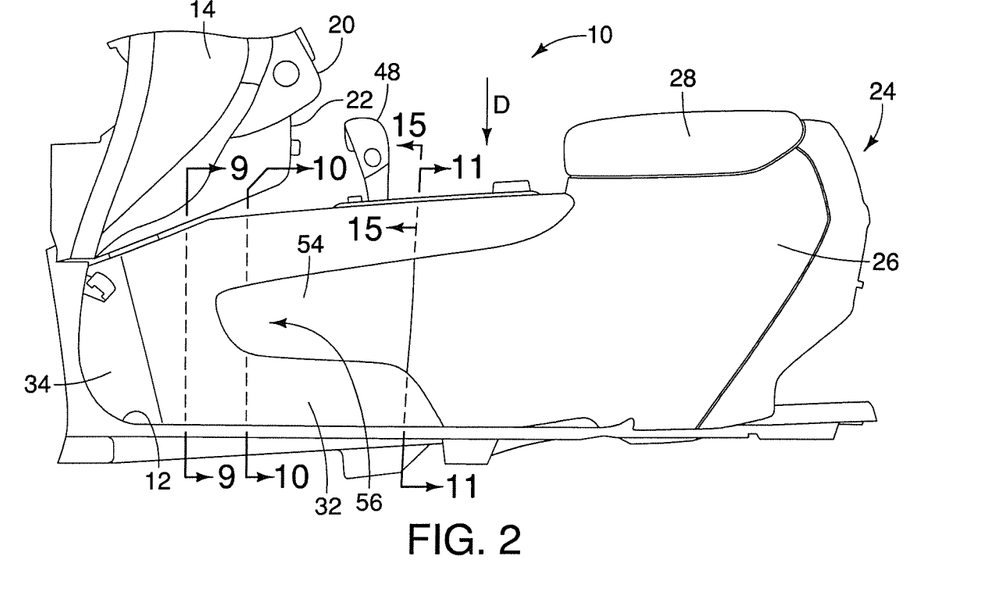
FIG. 2 is a side elevational view of the vehicle center console trim assembly shown in FIG. 1.

FIGS. 1 and 2 illustrate a passenger compartment 10 of a vehicle. The passenger compartment 10 includes, among other things, a floor 12, an instrument panel 14 (also referred to as a dashboard) and vehicle seats (not shown). The instrument panel 14 can be a conventional assembly that includes, for example, a steering assembly 16, a glove box 18, an audio system control panel 20, and a climate control panel 22. The instrument panel 14 can include a variety of other conventional components, such as windshield wiper controls, light controls, and so on.

Figure 3:
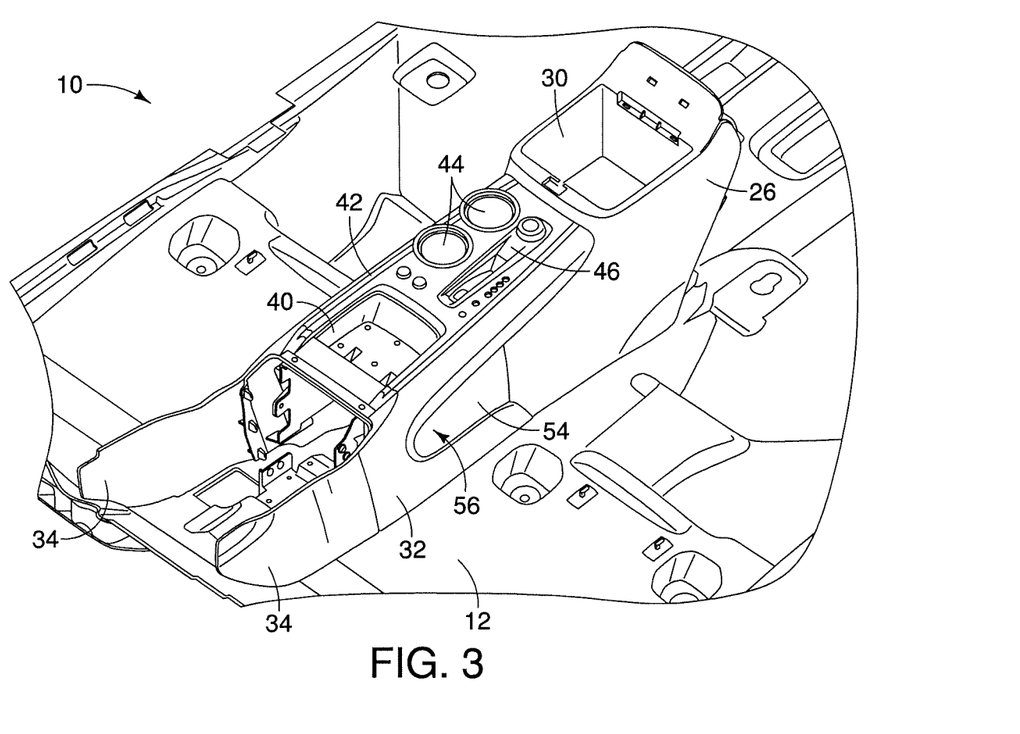
FIG. 3 is a perspective view of the passenger compartment with the instrument panel removed to further show the vehicle center console trim assembly with the lid removed.
Figure 4:
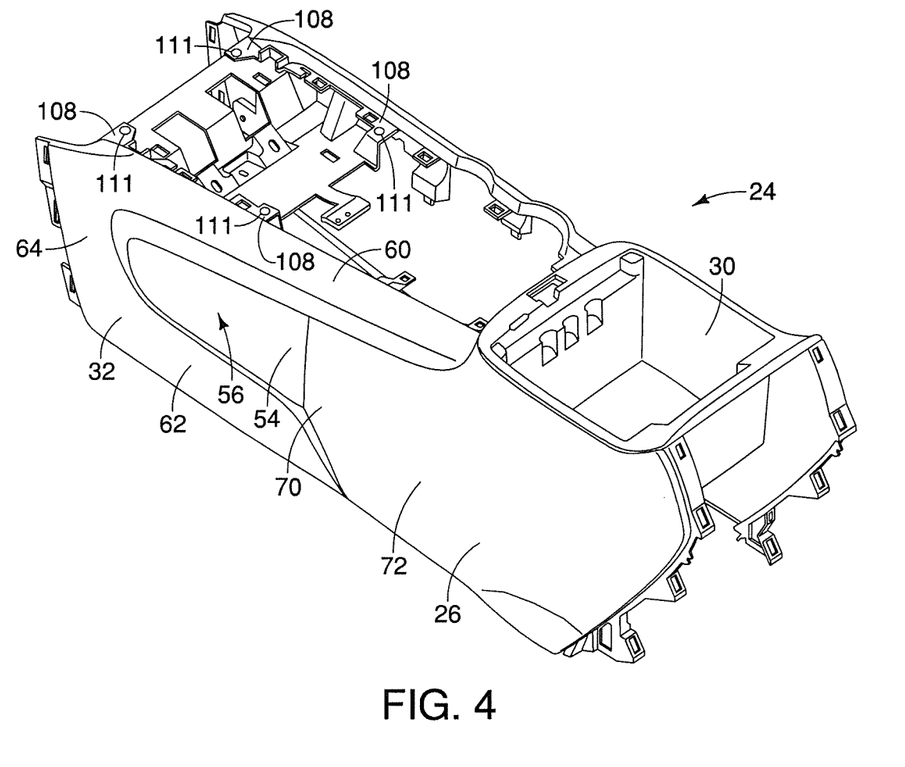
FIG. 4 is another perspective view of the vehicle center console trim assembly with the insert and lid removed.

The passenger compartment 10 further includes a vehicle center console trim assembly 24 in accordance with a disclosed embodiment. The vehicle center console trim assembly 24 is mounted to the floor 12 between the driver's seat and front passenger's seat using bolts, screws, rivets, clamps or in any other suitable manner as understood in the art. The vehicle center console trim assembly 24 includes a console body 26 and a lid 28 that is moveable between a closed position as shown in FIGS. 1 and 2 and an open position (not shown) as understood in the art. The lid 28 conceals a storage compartment 30, which is shown in FIGS. 3 and 4, when the lid 28 is in the closed position.

Figure 5:
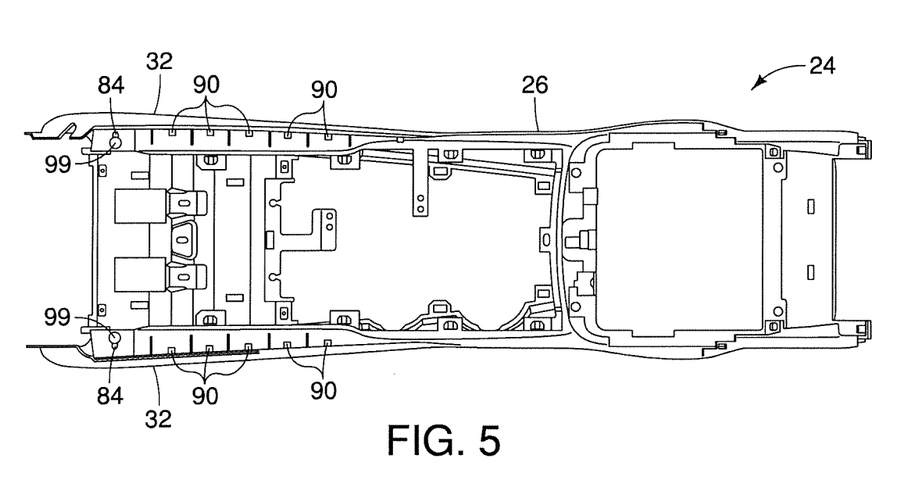
FIG. 5 is a bottom view of the vehicle center console trim assembly.
Figure 6:
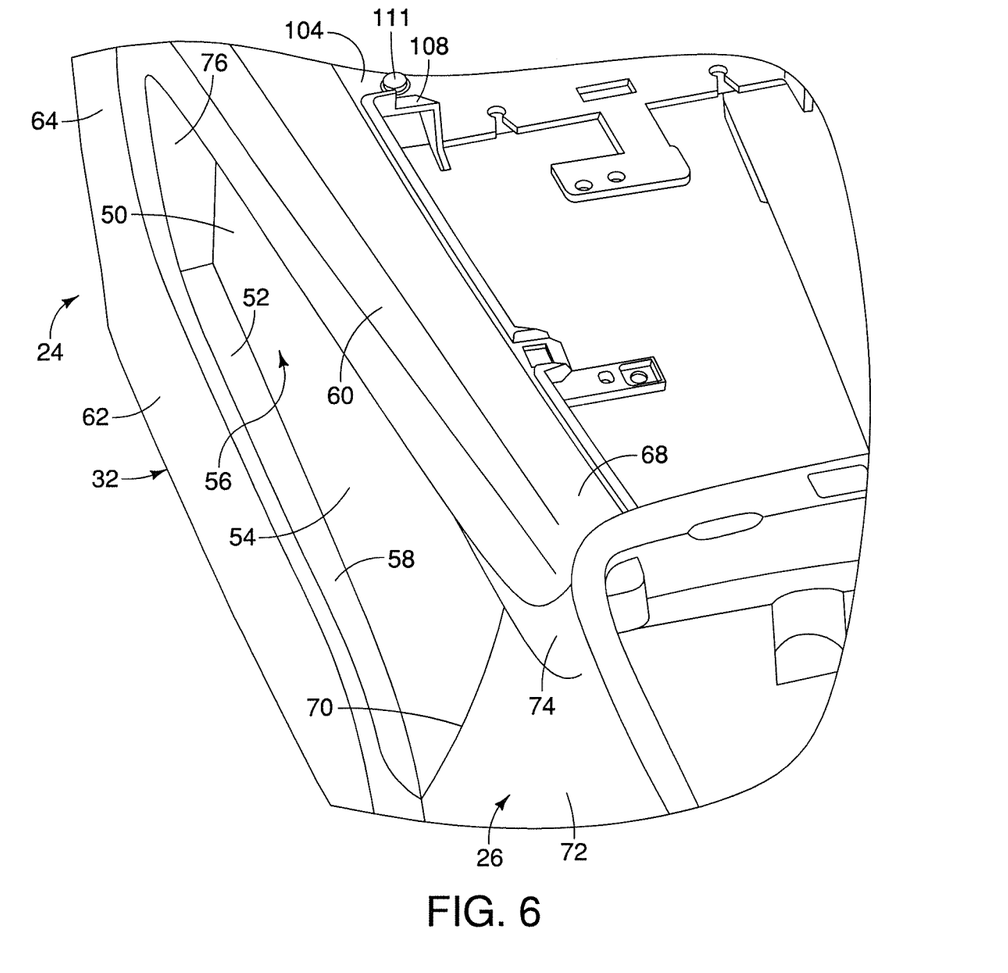
FIG. 6 is a detailed perspective view of the vehicle center console trim assembly showing a side pocket.
Figure 7:
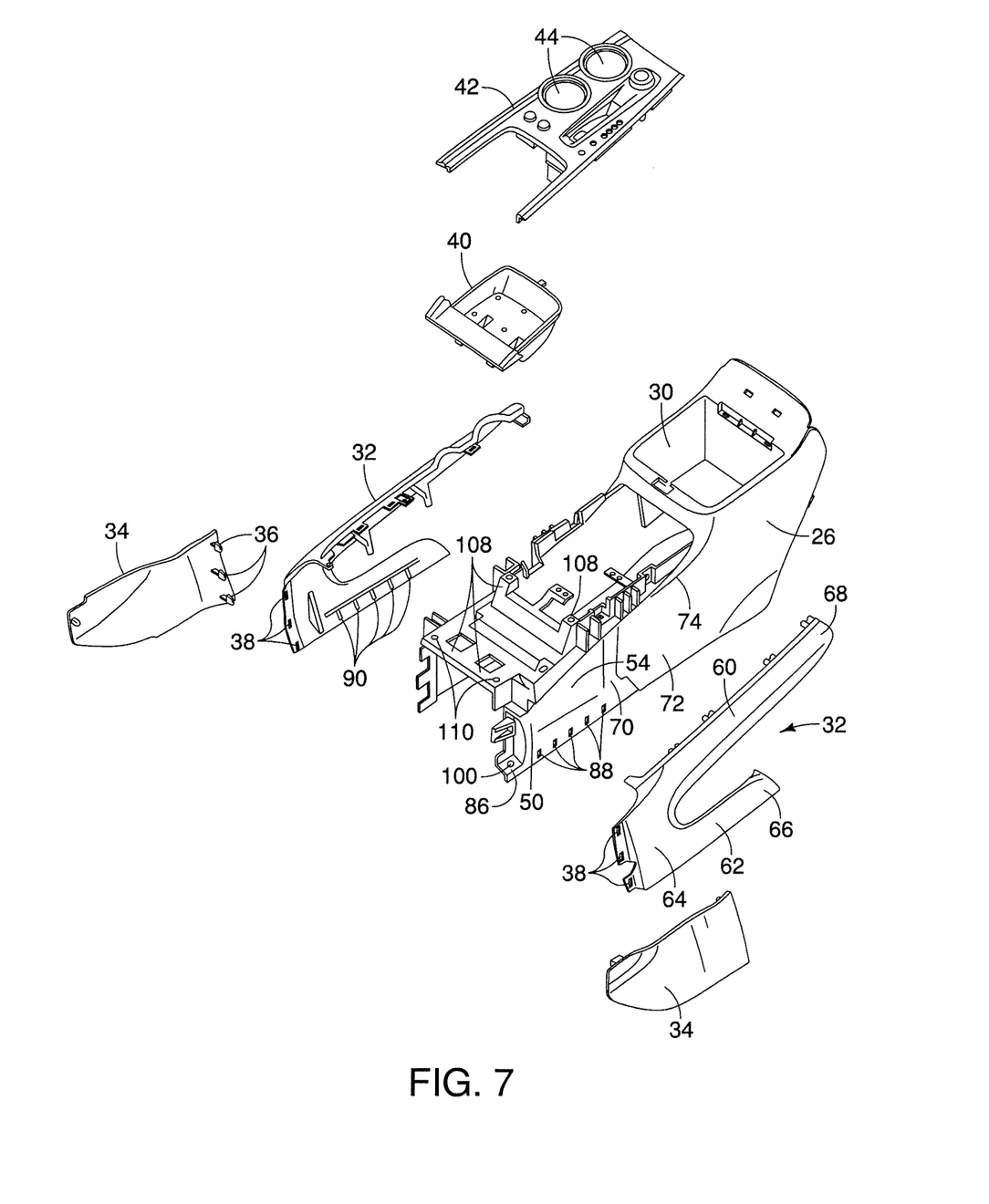
FIG. 7 is an exploded perspective view of the vehicle center console trim assembly.

As shown in FIGS. 1 through 4, and in more detail in FIGS. 5 through 7, the vehicle center console trim assembly 24 further includes two covers 32. For purposes of example, the cover 32 on a first side (e.g., a driver's side in left-hand drive jurisdictions) of the vehicle center console trim assembly 24 will be discussed in detail. However, as can be appreciated from the description herein, a second side (or front passenger side in this example) of the vehicle center console trim assembly 24 is substantially a mirror image of the center console trim assembly 24 at the first side. The console body 26 and covers 32 can be made of plastic, composites or any other suitable material. As further shown, extension portions 34 which are mirror images of each other can be attached to the front ends of the covers 32 by snap-fitting clips 36 that are received into openings 38 in the covers 32 as shown, or by any other suitable fastening arrangement such as screws, bolts, rivets and so on. Also, a tray 40 and a finisher panel 42 can be coupled to the console body 26 by snap fitting members (not shown) or other suitable fastening arrangements such as screws, bolts, rivets and so on. The finisher panel 42 can include, for example, cup holders 44 and a gear shift opening 46 that accommodates a gear shifter mechanism 48 as understood in the art. As shown, for example, in FIG. 7, the upper edge of the side cover 32 at the second side of the center console trim assembly 24 can be configured to correspond to the shape of the cup holders 44. Also, as can be appreciated from the discussion herein, the finisher panel 42 is installed on the console body 26 after the covers 32 are coupled to the console body 26.

Figure 8:
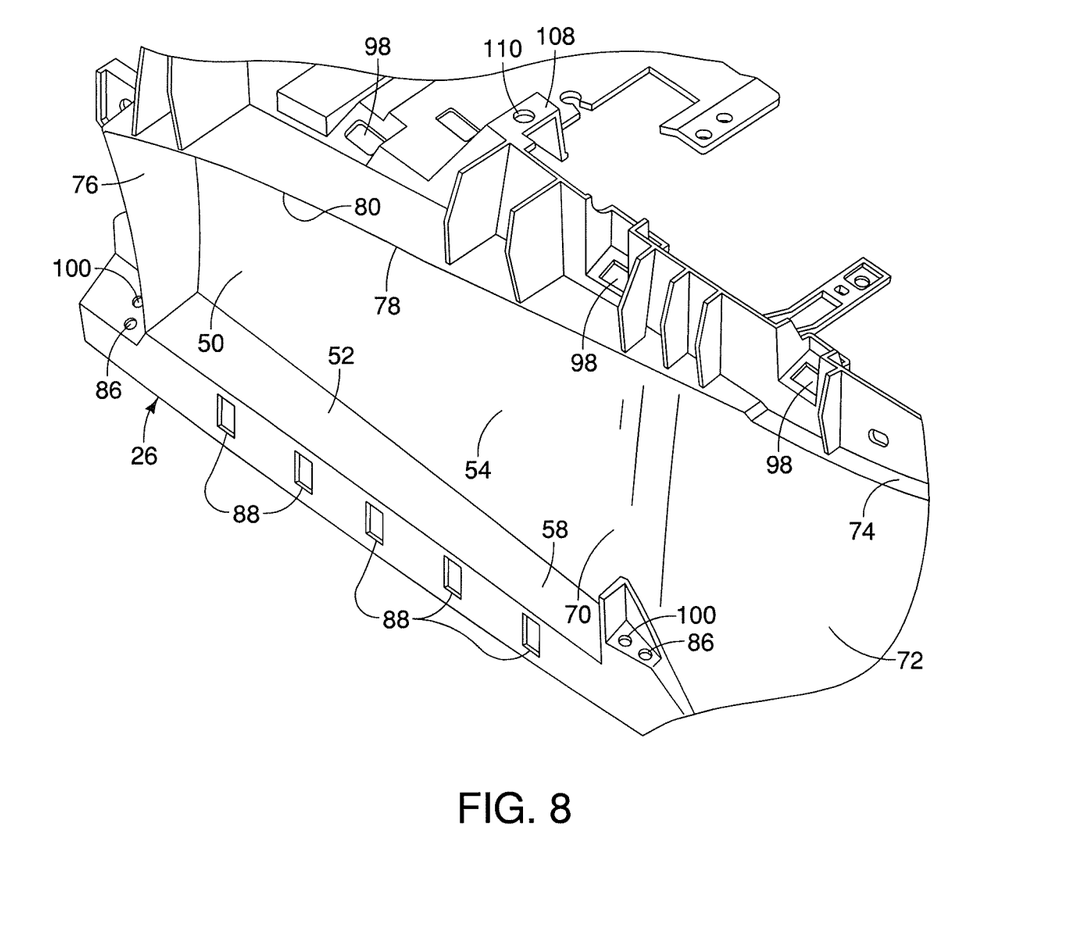
FIG. 8 is a detailed perspective view of the console body with a cover shown removed from the vehicle center console trim assembly.
Figure 9:
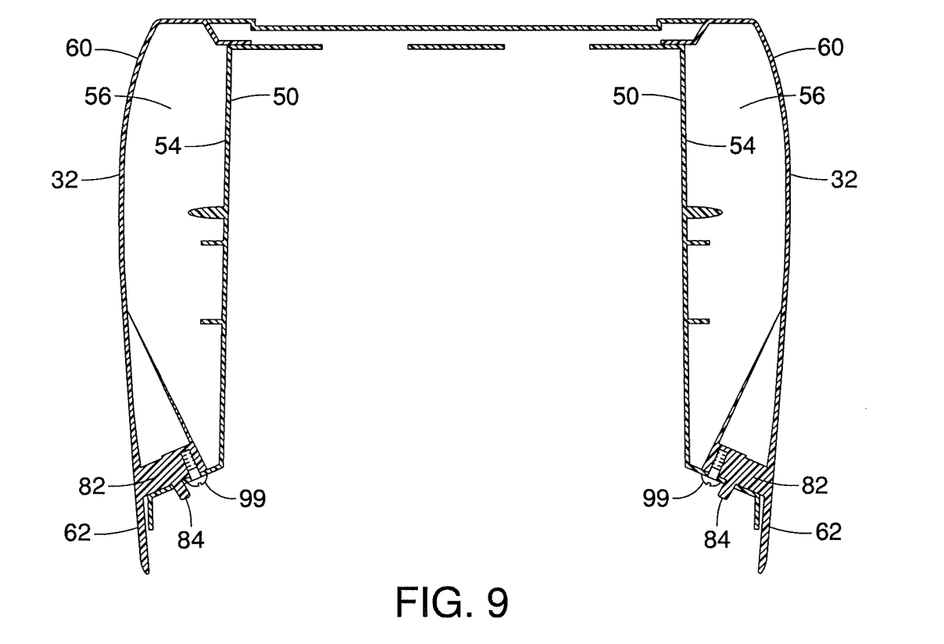
FIG. 9 is a simplified cross-sectional view of the vehicle center console trim assembly taken along lines 9-9 in FIG. 2.
Figure 10:
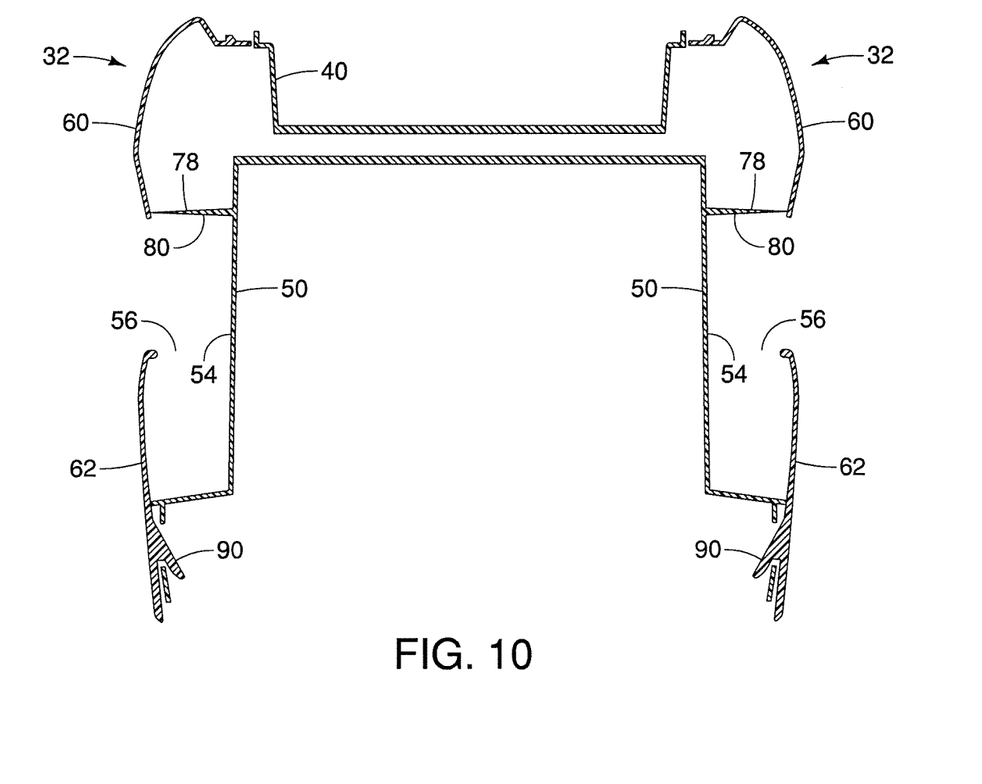
FIG. 10 is a simplified cross-sectional view of the vehicle center console trim assembly taken along lines 10-10 in FIG. 2.
Figure 11:
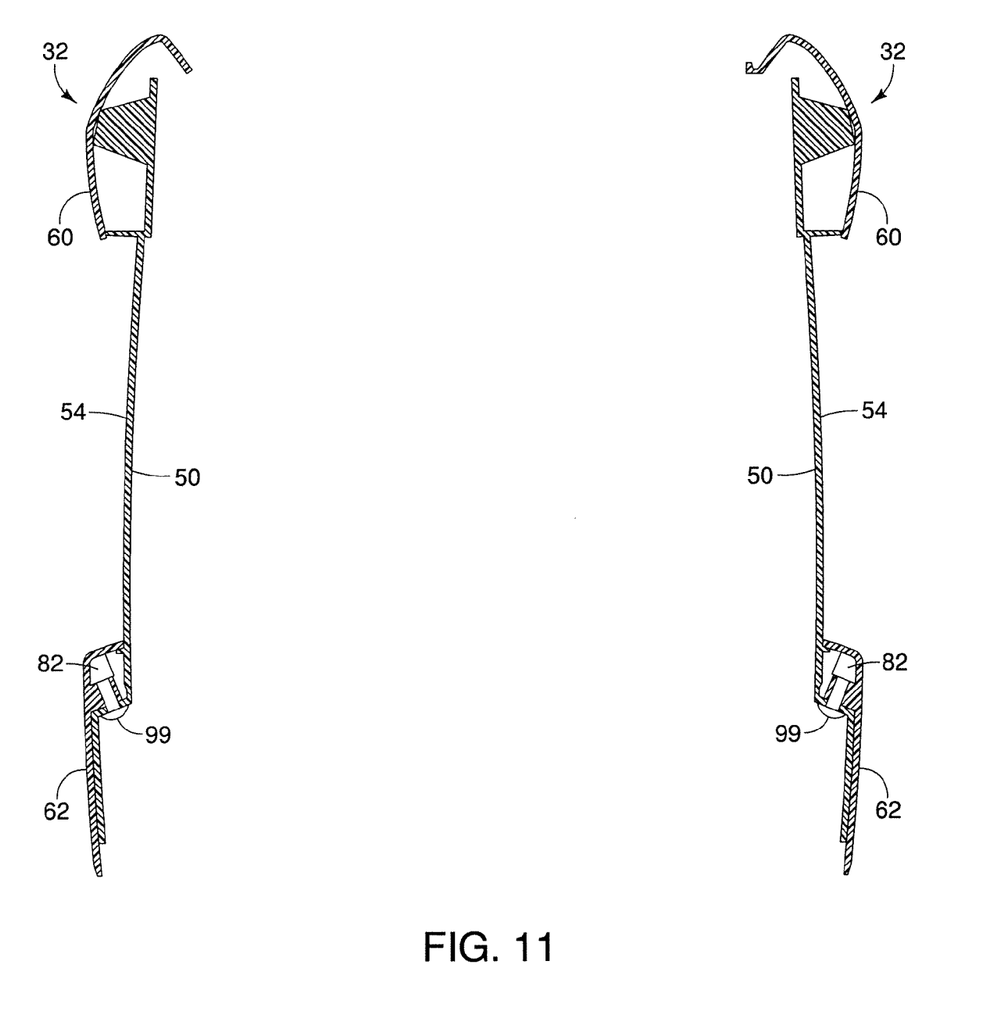
FIG. 11 is a simplified cross-sectional view of the vehicle center console trim assembly taken along lines 11-11 in FIG. 2.
Figure 12:
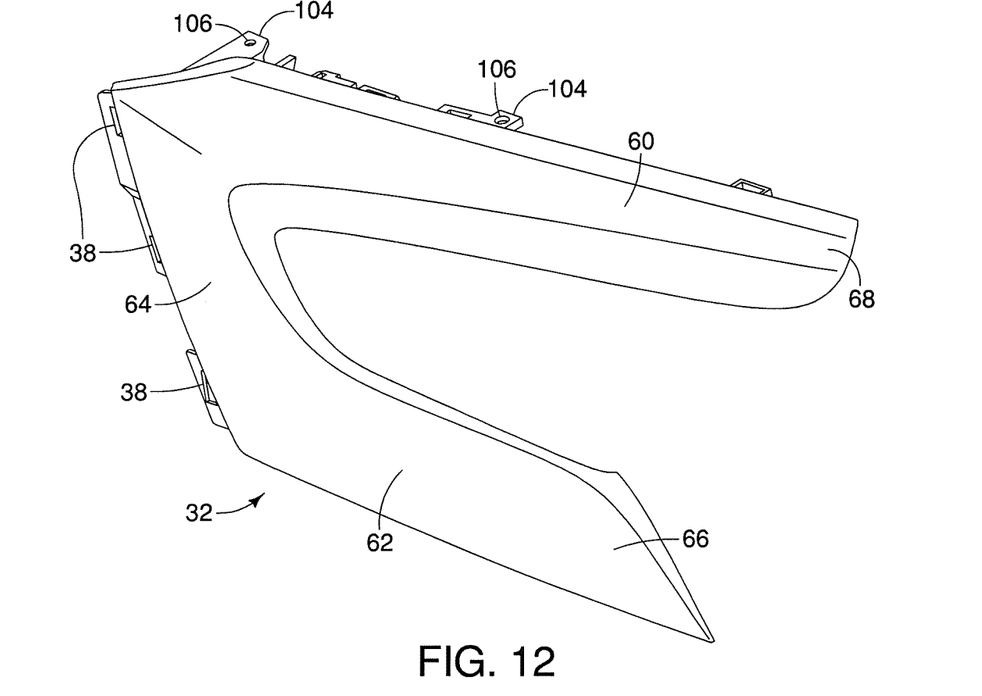
FIG. 12 is an outside perspective view of the cover shown in FIG. 6.
Figure 13:
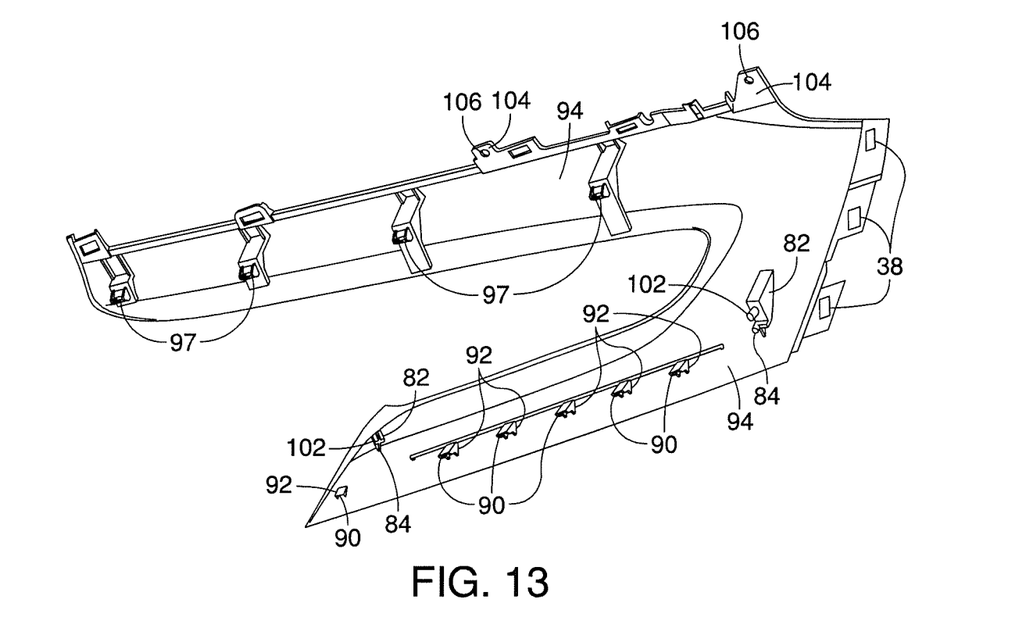
FIG. 13 is an inside perspective view of the cover shown in FIG. 6.
Figure 14:
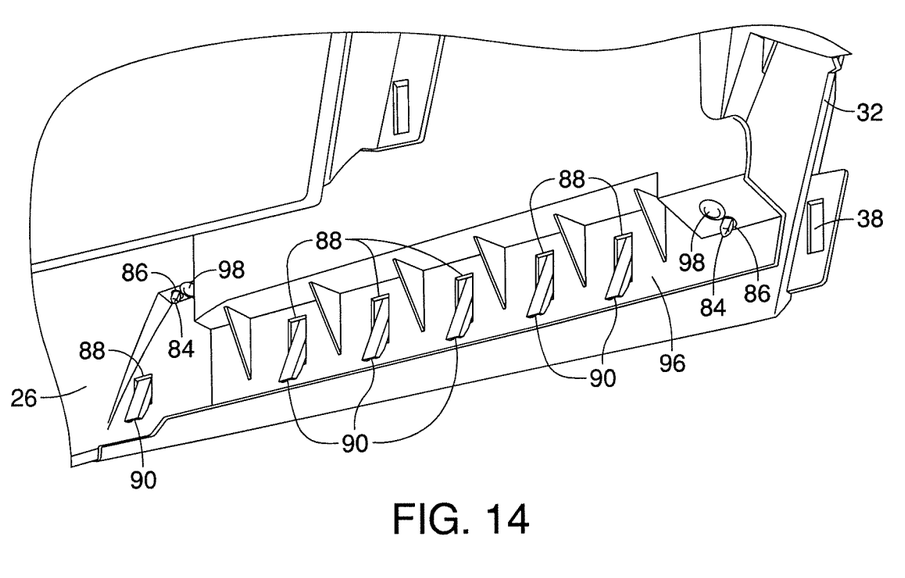
FIG. 14 is a detailed perspective view illustrating mounting structures extending from the cover and hooking onto mounting slots in the console body to couple the cover to the console body.

As shown in detail in FIG. 8, the console body 26 in this example includes a first side section 50 and a ledge 52 extending laterally from the first side section 50 along a lower body portion of the console body 26. As discussed in more detail below, the cover 32 is coupled to the console body 26 and overlies a side surface 54 of the first side section 50 to form a side pocket 56 between the cover 32 and the side surface 54 of the first side section 50 as shown, for example, in FIGS. 1 through 4 and 6. In this configuration, the ledge 52 defines a bottom surface 58 of the side pocket 56.

As further shown in FIGS. 1 through 4 and 5 through 7, for example, the cover 32 includes an upper cover portion 60 that extends along an upper body portion of the console body 26, which is spaced above the lower body portion of the console body 26. Accordingly, the upper cover portion 60 conceals the ledge 52 of the first side section 50 of the console body 26 from view in a downward vehicle looking direction D (FIG. 2) from a location above the console body 26.

The cover 32 further includes a lower cover portion 62 that extends along the lower body portion, and a middle cover portion 64 that extends integrally between the upper and lower cover portions 60 and 62. Thus, the cover 32 extends around a majority of the perimeter of the first side section 50. In this example, the cover 32 is a single unitary piece. However, the upper, lower and middle cover portions 60, 62 and 64, respectively, can be separate pieces that are coupled together by, for example, snap fitting, adhesive, screws, bolts, rivets or by any other suitable types of fasteners which can achieve a desired appearance. In addition, the lower cover portion has a lower free end 66. Similarly, the upper cover portion 60 has an upper free end 68 to permit access into the side pocket 56 between the lower and upper free ends 66 and 68 of the lower and upper cover portions 62 and 60. Furthermore, the upper cover portion 60 is longer than the lower cover portion 62 such that the upper free end 68 of the upper cover portion 60 is spaced farther from the middle cover portion 64 (i.e., is spaced further rearward) than the lower free end 66 of the lower cover portion 62.

As further illustrated, the console body 26 also includes a first pocket wall 70 extending laterally from the first side section 50 along a contoured path and a second side section 72 offset laterally outward from the first side section 50 by the first pocket wall 70. In this example, the first pocket wall 70 extends in the vehicle upward direction between the lower and upper body portions of the console body 26. The second side section 72 includes a curved upper edge 74 (FIG. 7) that curves upward as the curved upper edge 74 extends away from the first side section 50 (i.e., in a rearward direction). Thus, the upper cover portion 60 overlaps the second side section 72. More particularly, a distal end of the upper cover portion 60 contacts and conforms to a contour of the curved upper edge 74 as can be appreciated from, for example, FIGS. 1 through 4 and 6.

Returning back to FIG. 8, the console body 26 further includes a second pocket wall 76 extending laterally from the first side section 50 and extending transverse to the ledge 52 between the lower and upper body portions of the console body 26. The middle cover portion 64 thus extends from the upper cover portion 60 along the second pocket wall 76 as shown, for example, in FIGS. 1 through 4 and 6.

The console body 26 further includes an additional ledge 78 that extends laterally from the first side section 50 along the upper body portion of the console body 26 and defines a top surface 80 of the side pocket 56. Thus, the upper cover portion 60 extends along the additional ledge 78 to conceal the additional ledge 78 from view in a direction normal to the first side section 50 from a location spaced laterally from the center console trim assembly 24.

An example of the manner in which the cover 32 is attached to the console body 26 will now be described with regard to FIGS. 9 through 15, in particular. As shown, the lower cover portion 62 includes a plurality of bosses 82 (e.g., two or more bosses 82). The lower cover portion 62 can further include at least one locating pin 84. Accordingly, the locating pins 84 are received into respective locating openings 86 in the console body 26 to assist in properly positioning the cover 32 with respect to the console body 26. As further illustrated, the console body 26 in this example defines a plurality of mounting slots 88. The cover includes a plurality of mounting structures 90 that pass through the respective mounting slots 88 to couple the cover 32 to the console body 26. That is, each of mounting structures 90 includes a hook portion 92 that extends from an inner surface 94 of the cover 32 and contacts a surface 96 of the console body 26 defining the mounting slots 88. The hook portions 92 extend from the inner surface 94 of the cover 32 at a non-orthogonal angle to restrict movement of the cover 32 relative to the console body 26 in both downward and lateral directions. Moreover, the engagement of the mounting structures 90 with the mounting slots 88 maintains the cover 32 in tight contact with the floor 12 and, in particular, a carpet covering (not shown) on the floor 12 so that no gaps are present between the bottom edge of the lower cover portion 62 and the carpet. Thus, good fit and finish is maintained. Alternatively, the mounting structures 90 can extend from the console body 26 and pass through mounting slots 88 that are defined in the cover 32 provided there is sufficient clearance within the structure of the cover 32.

At the same time that the mounting structures 90 are inserted through the slots 88, fasteners 97 (e.g., clips) arranged along the inner surface 94 of the cover 32 along the upper cover portion 60 can be received within apertures 98 formed in the upper body portion of the console body 26 in a snap-fit engagement. Once the mounting structures 90 and the fasteners 97 couple the cover 32 to the console body 26, other fasteners 99 can be inserted through openings 100 in the console body 26 and into openings 102 in the bosses 82 to further secure the cover 32 to the console body 26. As shown, the fasteners 99 can include screws that fixedly attach the cover 32 to the console body 26. Naturally, each of the fasteners 99 restricts movement of the cover 32 relative to the console body 26. Alternatively, the console body 26 can include bosses and the fasteners 99 can pass through openings in the cover 32 and into openings in the bosses. Furthermore, as shown in FIGS. 4, 7, 12 and 13, the upper cover portion 60 of each cover 32 includes two or more first mounting flanges 104 that each include openings 106. Also, the upper body portion of the console body 26 includes second mounting flanges 108 that include openings 110. Accordingly, additional fasteners 111 can pass through the openings 106, 110 and mate with nuts or other complimentary fastening parts at an underside of the second mounting flanges 108 to further secure the cover 32 to the console body 26.

Figure 15:
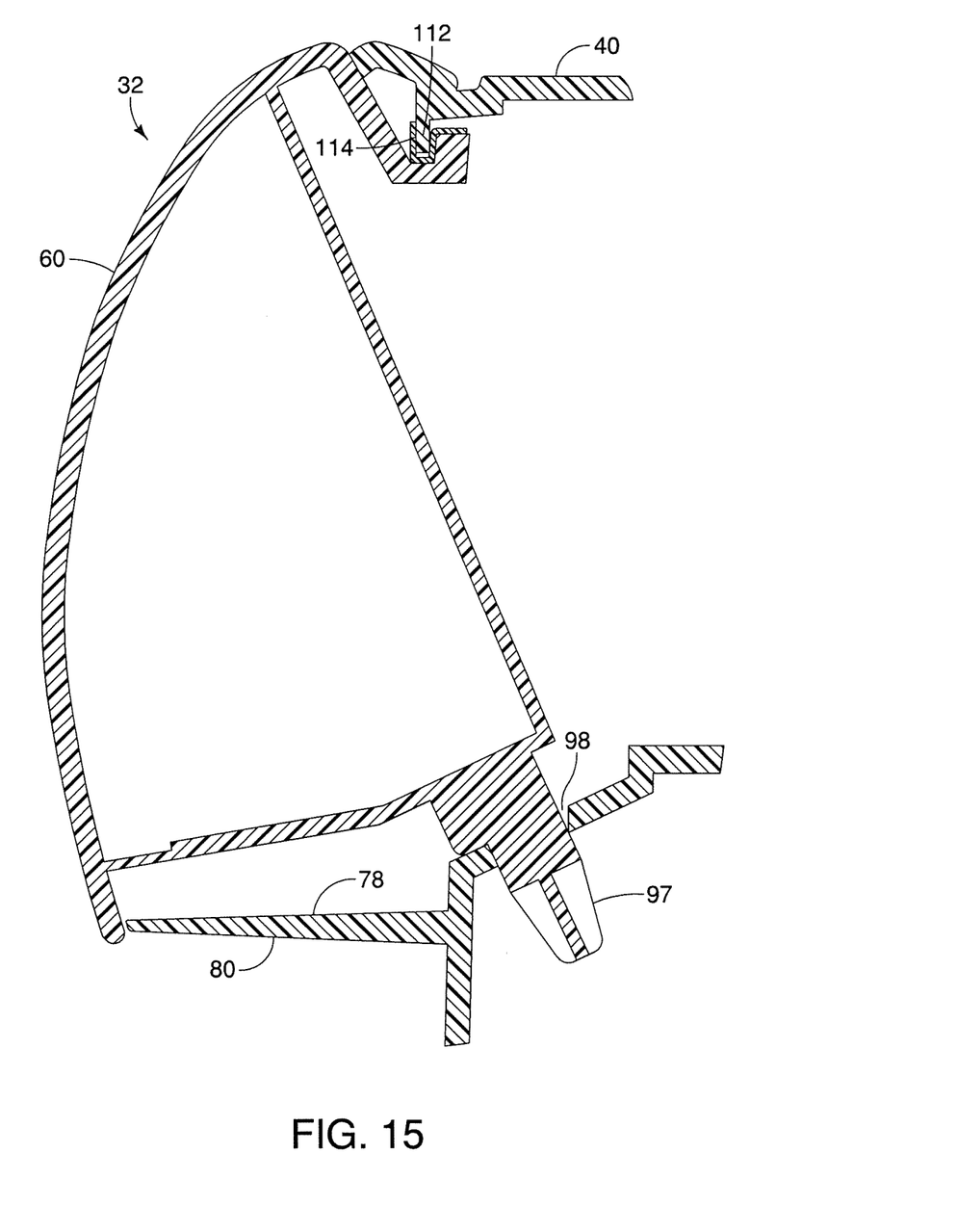
FIG. 15 is a detailed cross-sectional view taken along lines 15-15 in FIG. 2.

After both the covers 32 have been coupled to the console body 26, the finisher panel 42 can be coupled to the console body 26. For example, as shown in FIG. 15, downward flanges 112 on the finisher panel 42 can be received in slots 114 in the covers 32. The finisher panel 42 can be further secured to the console body 26 by snap-fit fasteners, screws, nuts or any other suitable type of fastener. Alternatively, flanges can extend upward from the console base 26, and the cover 32 can include complimentary slots.

Accordingly, as can be appreciated from the above, the arrangement of the console base 26 and the covers 32 provides good fit and finish for the vehicle center console trim assembly 24. Also, the size of the covers 32 can be changed extend further outward from the console base 26 to thus increase the width of the side pockets 56. Furthermore, the console base 26 and covers 32 can be formed as an integral unit such that the side pockets 56 are formed in the sides of the vehicle center console trim assembly 24 defined by the control base 26 and covers 32.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle and passenger compartment equipped with the vehicle center console trim assembly described herein. Accordingly, these terms, as utilized to describe the present invention should be interpreted relative to a vehicle equipped with the vehicle center console trim assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle center console trim assembly comprising:
   a console body including a first side section, a ledge extending laterally from the first side section along a lower body portion of the console body, a first pocket wall extending laterally from the first side section, and a second side section offset laterally outward from the first side section by the first pocket wall; and
   a cover coupled to the console body and overlying a side surface of the first side section to form a side pocket between the cover and the side surface of the first side section with the ledge defining a bottom surface of the side pocket, the cover including an upper cover portion that extends along an upper body portion of the console body, which is spaced above the lower body portion of the console body, with the upper cover portion concealing the ledge of the first side section of the console body from view in a downward vehicle looking direction from a location above the console body.

2. The vehicle center console trim assembly according to claim 1, wherein
   the cover further includes a lower cover portion that extends along the lower body portion, and a middle cover portion that extends integrally between the lower and upper cover portions.

3. The vehicle center console trim assembly according to claim 2, wherein
   the lower cover portion has a lower free end, and
   the upper cover portion has an upper free end to permit access into the side pocket between the lower and upper free ends of the lower and upper cover portions.

4. The vehicle center console trim assembly according to claim 3, wherein
   the upper cover portion is longer than the lower cover portion such that the upper free end of the upper cover portion is spaced farther from the middle cover portion than is the lower free end of the lower cover portion.

5. The vehicle center console trim assembly according to claim 2, wherein
   one of the lower cover portion and the console body includes bosses that receive fasteners that pass through the other of the lower cover portion and the console body.

6. The vehicle center console trim assembly according to claim 2, wherein
   one of the console body and the cover defines at least one mounting slot; and
   the other of the console body and the cover includes at least one mounting structure that passes through the mounting slot to couple the cover to the console body.

7. The vehicle center console trim assembly according to claim 6, wherein
   the at least one fastener includes a hook portion that extends from an inner surface of the cover and contacts a surface of the console body defining the mounting slot to restrict movement of the cover relative to the console body in a downward direction.

8. The vehicle center console trim assembly according to claim 7, wherein
   the hook portion extends from the inner surface of the cover at a non-orthogonal angle to restrict movement of the cover relative to the console body in both downward and lateral directions.

9. The vehicle center console trim assembly according to claim 1, wherein
the cover extends around a majority of the perimeter of the first side section.

10. The vehicle center console trim assembly according to claim 1, wherein
the upper cover portion overlaps the second side section.

11. The vehicle center console trim assembly according to claim 10, wherein
the second side section includes a curved upper edge that curves upward as the curved upper edge extends away from the first side section, and a distal end of the upper cover portion contacts and conforms to a contour of the curved upper edge.

12. The vehicle center console trim assembly according to claim 1, wherein
the console body further includes a second pocket wall extending laterally from the first side section and extending transverse to the ledge between the lower and upper body portions of the console body.

13. The vehicle center console trim assembly according to claim 12, wherein
the cover further includes a middle cover portion that extends from the upper cover portion along the second pocket wall.

14. The vehicle center console trim assembly according to claim 1, wherein
the console body further includes an additional ledge that extends laterally from the first side section along the upper body portion of the console body and defines a top surface of the side pocket.

15. A vehicle center console trim assembly comprising:
a console body including a first side section and a ledge extending laterally from the first side section along a lower body portion of the console body; and
a cover coupled to the console body and overlying a side surface of the first side section to form a side pocket between the cover and the side surface of the first side section with the ledge defining a bottom surface of the side pocket, the cover including an upper cover portion that extends along an upper body portion of the console body, which is spaced above the lower body portion of the console body, with the upper cover portion concealing the ledge of the first side section of the console body from view in a downward vehicle looking direction from a location above the console body;
the console body further including an additional ledge that extends laterally from the first side section along the upper body portion of the console body and defines a top surface of the side pocket; and
the upper cover portion extending along the additional ledge to conceal the additional ledge from view in a direction normal to the first side section from a location spaced laterally from the vehicle center console trim assembly.

16. The vehicle center console trim assembly according to claim 15, wherein
the console body further includes a first pocket wall extending laterally from the first side section and a second side section offset laterally outward from the first side section by the first pocket wall.

17. A vehicle center console trim assembly comprising:
a console body including a first side section and a ledge, with the first side section defining a plurality of mounting slots along a lower body portion of the console body, and the ledge extending laterally from the first side section along the lower body portion; and
a cover coupled to the console body and overlying a side surface of the first side section to form a side pocket between the cover and the side surface of the first side section, with the ledge defining a bottom surface of the side pocket, and the cover including a plurality of mounting structures, each of the mounting structures including a hook portion that extends from an inner surface of the cover, passes through a respective one of the mounting slots and contacts a surface of the first side section defining the mounting slots to restrict movement of the cover relative to the console body in a downward direction.

18. The vehicle center console trim assembly according to claim 17, wherein
the hook portions extend from the inner surface of the cover at a non-orthogonal angle to restrict movement of the cover relative to the console body in both downward and lateral directions.

19. The vehicle center console trim assembly according to claim 17, wherein
the cover extends around a majority of the perimeter of the first side section.

20. The vehicle center console trim assembly according to claim 17, wherein
the console body further includes an upper body portion and an additional ledge that extends laterally from the first side section along the upper body portion of the console body and defines a top surface of the side pocket.

* * * * *